H. L. DOHERTY.
METHOD OF HEAT RECUPERATION.
APPLICATION FILED JAN. 17, 1911.

1,150,838.

Patented Aug. 17, 1915.
2 SHEETS—SHEET 1.

Fig. 1.

Witnesses:

Henry L. Doherty, Inventor
By his Attorney Frank L. Young

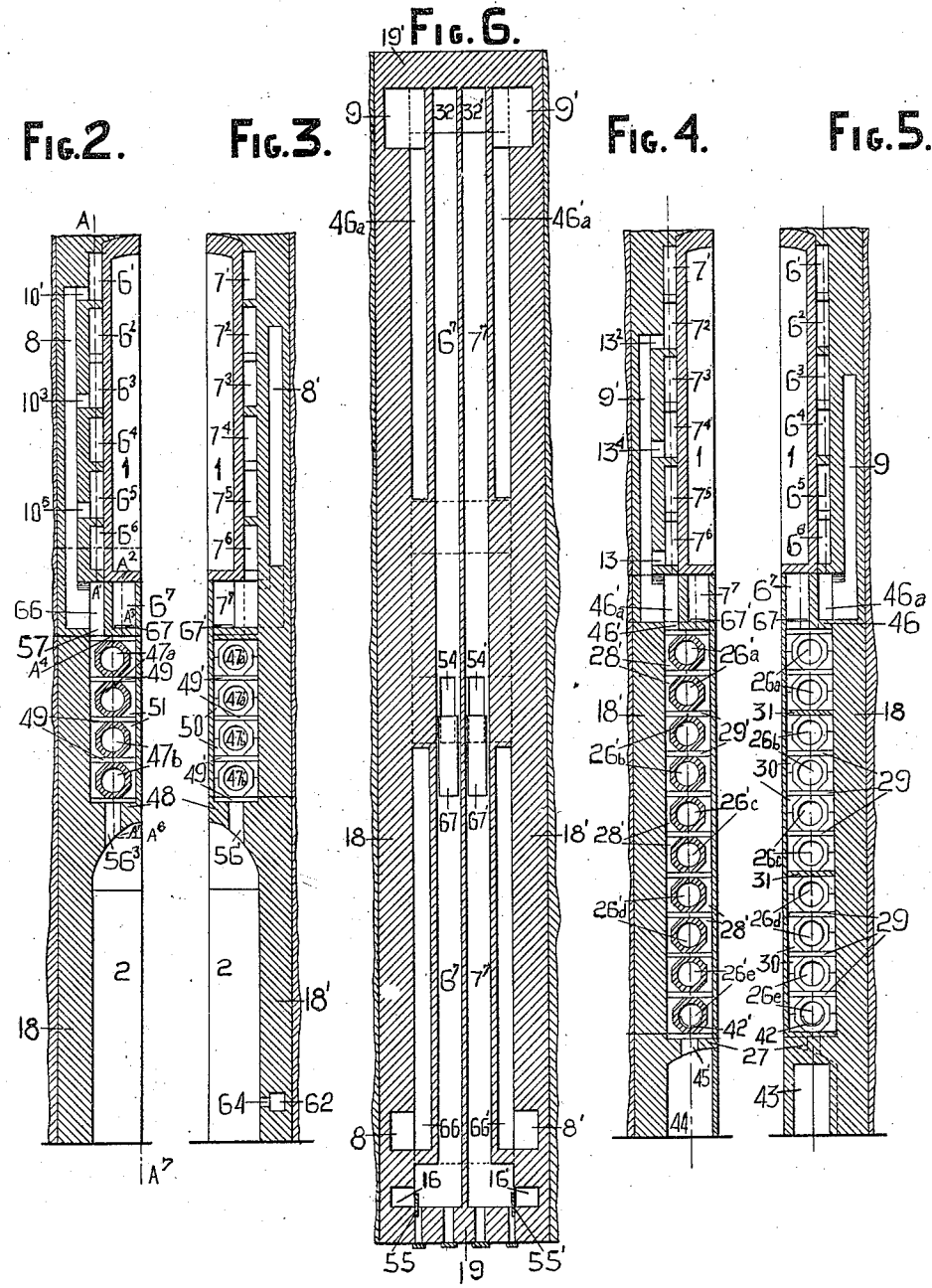

UNITED STATES PATENT OFFICE.

HENRY L. DOHERTY, OF NEW YORK, N. Y.

METHOD OF HEAT RECUPERATION.

1,150,838.  Specification of Letters Patent.  Patented Aug. 17, 1915.

Application filed January 17, 1911. Serial No. 603,089.

*To all whom it may concern:*

Be it known that I, HENRY L. DOHERTY, a citizen of the United States, and a resident of New York city, in the county of New York and State of New York, have invented certain new and useful Improvements in Methods of Heat Recuperation, of which the following is a specification.

My invention relates to a method of heat recuperation and, in particular, to a method of securing heat recuperation in producer-gas-fired furnaces by balancing the total heat capacities of the incoming and outgoing draft currents of the furnace.

The object of my invention is to provide a method of operating a producer-gas-fired furnace and its coöperating gas-producer whereby I am enabled to increase the heat carrying capacity of the air and producer gas supplied to the furnace sufficiently to permit of the same taking up approximately all of the sensible heat of the combustion gases discharging from the furnace.

This invention comprises a method of operating an apparatus of the character mentioned in which I divide the products of combustion discharging from the furnace into three streams, passing one stream through a recuperator to heat the producer gas, a second stream through a recuperator to heat the air supplied to the furnace, the first stream, after passing through the producer-gas recuperator, being advantageously joined to the second stream at a point in the air recuperator where the two are at approximately the same temperature, and passing the third stream through the fuel bed of the producer, whereby part of the sensible heat of the third stream is utilized in sustaining the reduction of part of its carbon dioxid to carbon monoxid by the carbon of the fuel, the temperature of the undissociated carbon-dioxid and nitrogen of the third current and the carbon monoxid formed by the dissociation of part of its carbon dioxid being thereby reduced to a temperature of about 1400 to 1500 degrees or to much below the temperature at which the products of combustion discharge from the furnace.

In the accompanying drawings, I have shown a form of apparatus for applying my invention to the operation of a coke-oven and its producer.

Figure 1 is a vertical longitudinal section through the apparatus on the line A, $A^1$, $A^2$, $A^3$, $A^4$, $A^5$ of Fig. 2. Fig. 2 is a vertical cross-section of one half of the apparatus on the line B, $B^1$, $B^2$, $B^3$, $B^4$, $B^5$ of Fig. 1. Fig. 3 is a vertical cross-section of the other half of the apparatus on the line C, $C^1$, $C^2$, $C^3$ of Fig. 1. Fig. 4 is a similar section on the line D, $D^1$, $D^2$, $D^3$, $D^4$, $D^5$, $D^6$, $D^7$ of Fig. 1. Fig. 5 is a similar section of the other half on the line E, $E^1$ of Fig. 1. Fig. 6 is a horizontal cross-section on the line F, $F^1$ of Fig. 1.

1, is the carbonizing chamber of the oven, 2 the gas producer, 3 the air recuperator, 4 the gas recuperator.

5 is the main combustion gas flue conducting away the flue gases from a battery of ovens.

$6^1$, $6^2$, $6^3$, $6^4$, etc., are the combustion flues of the oven on one side and $7^1$, $7^2$, $7^3$, $7^4$, etc., are the combustion flues of the other side of the oven.

8 and $8^1$ are the gas up-take flues for the two sides of the oven and 9 and $9^1$ the air up-take flues.

$10^1$, $10^3$, $10^5$, etc., are the gas nostrils connecting the gas flue 8 with the combustion flues $6^1$, $6^3$ and $6^5$.

$11^2$, $11^4$ and $11^6$ are the air nostrils connecting the air flue 9 with the combustion flues $6^2$, $6^4$ and $6^6$.

$12^1$, $12^3$ and $12^5$ are the gas nostrils connecting the gas flue $8^1$ with the combustion flues $7^1$, $7^3$ and $7^5$. $13^2$, $13^4$ and $13^6$ are the corresponding air nostrils for the same side of the oven. Dampers 14 and 14′ provide a means for regulating the flow of gas through the gas nostrils, and dampers 15 and 15′ a means for regulating the flow of air through the air nostrils.

The oven is symmetrical in all respects in relation to a vertical plane through its middle, so that the reproduction of both sides of the oven in the several views is unnecessary to a clear showing of its construction, but numerals referring to the duplicate parts are introduced, herein, for the sake of brevity and clearness in the description.

16 and 16′ are flues through which combustion gases are drawn down from the flues $6^7$ and $7^7$ under the action of the injectors 17 and 17′, respectively, and forced under the grate of the producer 2.

18 and 18' are the side walls of the oven and 19 and 19' the end walls.

20 is the feed chute of the gas producer 2. 21', the ash door giving access to the ash pit 21 and the grate 21'' of the producer.

22 are the hand holes, having covers 23, which provide access to the gas nostrils 10 and dampers 14.

24 and 25 are, respectively, the hand holes and covers of the air nostrils.

The air recuperator 3 comprises a series of flues, $26^a$, $26^b$, $26^c$, $26^d$, $26^e$ connected two in parallel, so that the gas current passing through them is divided between two flues. The flues 26, in the form of recuperator shown, are built up from the arch 27 within the vertical flues 28, 28', and are spaced by the spacers 29. The ends of the flues 28, 28', are closed by the special tiles 30 which are made to exactly fit the exterior of the flues 26. There are thus formed two chambers into which the ends of the flues 26 open. Horizontal partitions, 31, divide the chamber thus left in the front of the oven into three sections, 32, 33 and 34, which form the return connections for the flues 26, dividing them, in effect, into a return-bend flue composed of two parallel sections. The horizontal partition 35 forms the return connection 36 for the upper flues of the recuperator at the rear. The partition or arch 37 forms the return-connections 38 and 39 at the rear of the recuperator. Connecting with 38 is the passage 40, through which the products of combustion which have passed through the gas recuperator 4, enter the chamber 38 and join the flue gases which have passed through the upper part of the air recuperator, the combined currents passing thence through the lower two divisions of the flues 26 of the air recuperator, and through 39 into the flue 41 leading to the main combustion gas flue 5. A tile, 42, serves as a damper to the passage 41. The air enters the recuperator through the inlet passage 43 and passes back through the flue 44, whence it passes through the ports 45 into the main air flue 28. The air discharges from the flues 28 through the ports 46 into the air flue $46^a$, thence into the air up-take flues 9 and $9^1$, respectively, from which it passes through the respective nostrils, $11^2$, $11^4$, $11^6$ and $13^2$, $13^4$, $13^6$, into the respective combustion flues 6 and 7.

The construction of the producer gas recuperator is similar, in principle, to that of the air recuperator. Horizontal flues, $47^a$, $47^b$, provide a path for the passage of combustion gas through the recuperator. These flues 47 are built up from the producer arch 48, within the gas flue 51, being separated by the spacers 49. Tiles, 50, prevent communication between the forward ends of the flues 47 and the producer gas flue 51. The chamber 52 forms a return-connection between the flues $47^a$, $47^b$. The partition 53 forms the chamber 54 establishing communication between the inlet ends of the flues 47 and the lower combustion flue $6^7$. A tile, 67, serves to regulate the flow of combustion gas from the flue $6^7$ to the upper set of flues 47. Nostrils, 56, provide passage for the producer gas from producer 2 to the gas flue 51. A passage, 57, establishes communication between the gas flue 51 and the flue 66 connecting with the gas up-take flue 8. Hand-holes 58, with covers 59, provide means of access to the flues 47 of recuperator 4. Hand-holes 60, with covers 61, provide a means of access to the flues 26.

The method of operating is as follows: A bed of ignited fuel having been built up in the producer 2 in the manner well known to those skilled in the art, the gas formed in the producer is permitted, at first, to waste through the various flues, the air nostrils $11^2$, etc., and $13^2$, etc., being tightly shut. When the quality of the gas coming off from the gas producer 2 has improved sufficiently to readily ignite, the upper air dampers 15 are partially opened, admitting air to the flues $6^2$ and $7^2$, and the gas ignited by the insertion of a red hot iron rod or by a lighted torch through the upper hand-holes 24. Sufficient air is admitted through the nostrils $11^2$ and $13^2$ to not only burn all of the gas, which is admitted through the gas nostrils $10^1$ and $12^1$ but to leave an excess of air in the gases filling the flues $6^2$ and $7^2$. At the gas nostrils or ports $10^3$ and $12^3$, more gas is admitted, the quantity being sufficient to combine with the excess of air mentioned, the temperature of the gas mixture being above ignition temperature, and to leave an excess of gas in the gases flowing through flues $6^3$, $7^3$. At the air nostrils $11^4$, $13^4$, a further excess of air is admitted which burns the previous excess of gas which is present in the mixture as it discharges from the flues $6^3$ and $7^3$ into the flues $6^4$ and $7^4$. Further portions of gas and air are added to the current of combustion gases passing through the combustion flues at the nostrils $10^5$—$12^5$ and $11^6$—$13^6$, respectively. The volume of air admitted through the lower air nostrils $11^6$—$13^6$ is to be restricted to that quantity which is required to secure complete combustion of the producer gas. Owing to the fact that the air admitted through the lower air ports is, of course, greatly diluted by the gases from the preceding combustions, a very considerable excess is required to prevent an unduly prolonged combustion taking place in flues $6^6$—$7^6$ and $6^7$—$7^7$ of the residuum of the gas admitted through the gas nostrils $10^5$—$12^5$. The gases should discharge from the lower combustion flues ($6^7$—$7^7$) completely burned. The volumes of gas entering the combustion flues through the several nostrils 10 and 13 are regulated so that a fairly uniform temperature is maintained throughout the lengths of the flues 6 and 7.

My invention relates, essentially, to the disposition which I make of the combustion gases from this point on. The method of conducting combustion, described above, I do not claim herein, but in a separate application Ser. No. 603,088 filed Jan. 17th, 1911. This application is concerned with the method of recuperating the heat of the combustion gases, which I use in my invention.

The very hot combustion gases passing through the flues $6^7$ and $7^7$ are divided into three separate currents in each case. In the case of the combustion gases from the flue $6^7$, one current is taken down through the passage 54 and passes through the flues 47 of the producer gas recuperator 4. A damper, 67, in connection with other dampers, to be described later, regulates the proportion of the total combustion gases in $6^7$, which is permitted to pass into the flues 47. A second portion of the combustion gases passes through the length of flue $6^7$ and thence down through the passage 32 into the upper two, parallel flues, 26, which I have designated $26^a$. Passing through the flues $26^a$ the combustion gases of this second current enter the flues $26^b$ and flow through these flues to the chamber 33, forward again through the flues $26^c$ to chamber 38. The first current flows through the flues $47^a$ and $47^b$ of the producer gas recuperator, into the passage 40, through 40 into the chamber 38 where it joins the second current from the flues $26^c$. The combined first and second currents from 38 pass through the flues $26^d$ into the chamber 34, thence through the flues $26^e$ and passages 39 and 41 into the main smoke flue 5 leading to the chimney. A movable tile, 42, serves as a damper to regulate the flow of gases from 39 to the chimney flue 5. The third current of combustion gases, under the influence of injector 17, is drawn down through the flue 16, opening out of $6^7$ at the combustion gas inlet of same, and is forced by the injector through the ports 64 into the ash-pit 21 of producer 2. The injector 17 is actuated by air under pressure which enters through the pipe 63. The injector 17 should be of some efficient type that will permit of a large volume of combustion gases being drawn down through the flue 16 relative to the volume of air introduced through the nozzle 64. The mixture of air and products of combustion passes up through the grate 21″, and into the bed of ignited fuel thereon. The combustion gases drawn down through 16 are, initially, at a comparatively high temperature, say, 2000° to 2200° Fah. The combustion gases, in admixture with the air, pass up through the incandescent fuel, the carbon dioxid of the same reacting with the carbon of the fuel according to the reaction (a) $CO_2+C=2CO$. This reaction causes an absorption, under the conditions obtaining of about 6123 B. T. U. per pound of carbon of the fuel reacting. If the combustion gases were entered alone into the fuel bed the sensible heat of the gases—assuming that they are entered into the fuel bed at 2000°—would supply, above the temperature of the fuel bed (which may be taken as 1400 degrees), about 1941 B. T. U. per pound of carbon of the fuel combining with the $CO_2$ of the combustion gases. If we assume that the combustion gases carry about 2.1% by weight of free O, the combustion of this O would render available about 874 B. T. U. above 1400°. The total available heat furnished by the flue gas bearing the $CO_2$, which is dissociated by reaction (a) would be about $1941+877=2818$ B. T. U. This would leave a deficiency of about 3305 B. T. U. that must be supplied to the fuel bed in some way to insure the maintenance of reaction (a). Usually, this deficiency is made up by the heat developed by the combustion of part of the fuel in the producer by the air supplied with the combustion gas, according to the reaction (b) $C+O=CO$. Since the heat rendered available to reaction (a) by the combustion of 1 lb. of carbon by reaction (b)=about 2217 B. T. U., the weight of carbon that must be burned by reaction (b), to supply the deficit in heat by (a), would be $\frac{3305}{2217}$ =1.49 lb.

Now, according to my invention, instead of making up the deficit in heat of the combustion gases almost entirely by reaction (b), I make up a material portion of this deficit by supplying to the fuel bed a greater volume of combustion gas from the combustion flues of the apparatus than can be dissociated by the fuel in the producer. This surplus gas gives up to the fuel bed all of the sensible heat which it carries between its initial temperature and the temperature of the fuel bed—under the conditions assumed, about 142 B. T. U. per pound. If, by so adjusting the depth of fuel bed and the velocity of the draft current that $\frac{3305}{142}=23.3$ lb. of combustion or flue gas could be passed through the fuel bed with its $CO_2$ undissociated per pound of carbon reacting according to reaction (a), the reaction could theoretically be maintained without the use of any primary air. Such a method of operation, however, would produce a very weak producer gas, since the proportion of flue gas that would be theoretically required would be nearly double the proportion that would be required to furnish the $CO_2$ for reaction (a)—the latter requirement being about 13.7 lb. of a flue gas containing an excess of 2.1% of free O, which is about the smallest working excess practicable. Therefore, in carrying out my invention, I do not aim to carry on the gas making operation without any primary air, but, to limit the proportion of air introduced into the producer to the smallest practicable amount permissible under the method of operation described. This, in practice, will be the volume of air that must be used in the injector 17 to divert the portion of the combustion products going to the producer from flues $6^7$ and $7^7$ through the flues 16 and 16' to the ash pit of the producer. The volume so required will vary with the pressure of the air, the shape of the air and receiving nozzle, size of suction ducts, etc. Therefore, I cannot prescribe any exact proportion between the primary air and flue gas, other than that I restrict the air to the lowest practicable volume in any case.

It is to be noted that, by this method of operating my producer, I affect materially the recuperation of heat from the combustion products. In the first place, the carbon monoxid produced per ton of fuel consumed on the grate, is much greater than when the producer is run in the usual way. Since such of the $CO_2$ of the combustion gases as reacts with the fuel on the grate, produces double its own volume of carbon monoxid having a thermal capacity of about 1.46 times the thermal capacity of the $CO_2$ dissociated, it is evident that my method of operation tends to increase the thermal capacity of the draft current flowing to the combustion flues. This, under ordinary methods of working, without preheating of the primary air and with a high temperature in the producer, is less than one-half of the thermal capacity of the products of combustion. In the second place, I have converted a large portion of the total sensible heat carried by the combustion gases as they discharge from the combustion flues, into latent heat in the dissociation of that portion of the $CO_2$ of the gases that the fuel bed will dissociate under the conditions of operation obtaining. My aim is to, as nearly as practicable, equalize the heat capacities of the gaseous currents flowing to the combustion flues, and the products of combustion discharging from the flues. By as much as I can approach this condition, just so much do I approach the realization of the conditions that make the perfect recuperation of the heat of the waste products of a furnace practicable.

Having described my invention, what I claim is:

1. The method of recuperating the heat of the combustion gases from a gas-fired furnace which comprises transferring a part of the sensible heat of one portion of said combustion gases to heat the gas supplied to said furnace, in transferring part of the sensible heat of another portion of said combustion gases to preheated air, and transferring the major portion of the remaining sensible heat of both of said currents of combustion gases to air, to preheat the same.

2. The method of recuperating the heat of the combustion gases from a gas-fired furnace which comprises passing one portion of said combustion gases through a gas recuperator to raise the temperature of the gas supplied to said furnace, passing another portion of said combustion gases through an air recuperator to heat the air supplied to said furnace, and mingling the first of said portions of combustion gases after it has passed through the said gas recuperator with the second of said portions of combustion gases at such place in the said air recuperator at which the two portions approximate in temperature.

3. The method of recuperating the heat of the combustion gases from a gas-fired furnace, which comprises passing one portion of said combustion gases through the fuel bed of the gas producer of said furnace, passing a second portion of said combustion gases through a producer gas recuperator to raise the temperature of the producer gas from said gas producer, passing a third portion of combustion gases through an air recuperator to heat the air supplied to said furnace, and adding the said second portion of combustion gases, after they have passed through said producer gas recuperator, to the said third portion of combustion gases at an intermediate region of said air recuperator.

4. The method of recuperating the heat of the combustion gases from a gas-fired furnace, which comprises dividing the said gases into three streams, passing the first of said streams through the fuel bed of a gas producer, passing the second of said streams through a producer gas recuperator to raise the temperature of the producer gas before the latter is introduced into said furnace, passing the third of said streams through an air recuperator to heat the air supplied to said furnace and in mingling the said second stream, after the same has been used to heat the said producer gas, with the said third stream of combustion gases at such a place in the said air recuperator as the temperature of the said third stream passing therethrough approximates to the temperature of the said second stream.

5. The process of recuperating heat of combustion gases from a producer-gas-fired furnace, which comprises passing a portion of said combustion gases in admixture with a minimum volume of air through the fuel bed of the gas producer of said furnace to generate CO, in part by reaction of a portion of the $CO_2$ of said portion of combustion gases and in part by the reaction of the O of the air with carbon of said fuel bed, the volume of said portion of combustion gases being materially greater than that corresponding to the $CO_2$ which said fuel bed is capable of reducing under the conditions obtaining therein, the heat for the reduction of that portion of the $CO_2$ reacting with the carbon of said fuel bed being supplied in part by the sensible heat of the said portion of combustion gases, and in part by heat developed by the reaction of the O of said air with said fuel bed, transferring heat from another portion of said combustion gases to the gases discharging from said fuel bed, passing a third portion of combustion gases through an air recuperator to heat air, and adding the said second portion of combustion gases, after they have been used to heat the said gases from said fuel bed, to the said third portion of combustion gases in said air recuperator, whereby an approximately balanced thermal capacity is secured between the gases flowing to the combustion region of said furnace and the gases flowing from the said combustion region.

6. The method of recuperating the heat of the combustion gases from a gas-fired furnace, which comprises increasing the heat-carrying capacity of the draft current supplied to said furnace by passing one portion of said combustion gases in admixture with air through the fuel bed of the gas producer of said furnace, whereby a part of the carbon dioxid of said combustion gases is converted into carbon monoxid and a further volume of carbon monoxid is formed by reaction between the oxygen of said air and said incandescent carbon, passing a second portion of said combustion gases through a producer gas recuperator to raise the temperature of the producer gas, generated in said producer, passing a third stream of combustion gases through an air recuperator to heat the air supplied to said furnace, and adding the said second stream of combustion gases, after the same has passed through the said producer gas recuperator, to the said third stream at that level in the said air recuperator at which the said third stream approximates to the temperature of said second stream.

Signed at New York city in the county of New York and State of New York this 16th day of January A. D. 1911.

HENRY L. DOHERTY.

Witnesses:
 J. M. McMILLIN,
 FRANK L. BLACKBURN.